Patented Jan. 10, 1939

2,143,759

UNITED STATES PATENT OFFICE 2,143,759

TERTIARY ALKYLARYLOXY ALKYL SULPHATES

Herman A. Bruson, Philadelphia, Pa., and Otto Stein, Frankfort-on-the-Main, Germany, assignors to Röhm & Haas Company, Philadelphia, Pa.

No Drawing. Original application November 30, 1934, Serial No. 755,358. Divided and this application August 22, 1936, Serial No. 97,347

14 Claims. (Cl. 260—457)

This invention relates to new ether alcohols having the general formula A—R—O—R¹, wherein R represents an aromatic ring, A represents a tertiary alkyl group containing at least eight carbon atoms as a nuclear substituent of R; and R¹ represents a monohydroxy or dihydroxy-alkylene radical, which may contain one or more sulphuric acid ester groups.

This application is a division of our co-pending application Serial No. 755,358, filed November 30, 1934, matured as Patent No. 2,075,018, Mar. 30, 1937.

These new ethers in the unsulphated form are high boiling, colorless oils which, in contrast to the known lower homologous phenoxyalkylols, are odorless, insoluble in water, and readily soluble in aliphatic hydrocarbons such as lubricating oils. On account of their oily and penetrant qualities, their unctuous nature and their freedom from odor or rancidity, these new ethers are useful as textile lubricants, or as lubricants for fine mechanisms such as watches. They are furthermore useful in the manufacture of wetting, emulsifying or detergent materials as for example, by the sulphonation or sulphation respectively of group R or R¹. They may also be employed as plasticizers for synthetic resins, and for coating compositions comprising oleoresinous varnishes, cellulose esters or cellulose ethers. When used in the form of their sulphonated derivatives or in the unsulphonated condition they may be added to insecticides, cosmetics, soaps, tanning materials, or dyestuffs in order to obtain better dispersions thereof, or for improving their properties.

The raw materials required for the preparation of these new ether alcohols are tertiary alkylphenols containing at least eight carbon atoms in the tertiary alkyl group, as obtained by condensation of tertiary olefines; for example, diisobutylene, dibutenes, triisobutylene, tetraisobutylene, diisoamylene and the like, with phenols, cresols, xylenols, naphthols, guaiacol, and similar phenols or their nuclear halogenated derivatives, as described in co-pending patent applications, Serial Nos. 600,826, filed March 23, 1932, by W. F. Hester, (now Patent No. 2,008,017), 697,928, filed November 14 1933 by H. A. Bruson, (now Patent No. 1,987,228) and also as described in Journal of American Chemical Society, 55, 2571 (1933).

These tertiary alkylphenols condense readily in the presence of small quantities of alkali metal hydroxides or carbonates, with alkylene oxides such as ethylene oxide, propylene oxide, or isobutylene oxide to yield the corresponding alkylphenoxyalkylols. In place of the alkylene oxides, the alkylene halohydrines such as ethylene chlorhydrine, propylene chlorhydrine, glycerol chlorhydrine, isobutylene chlorhydrine, and the like, can be used, in which case the phenols are used preferably in the form of their alkali metal phenates. In both cases it is preferable to conduct the condensation in an anhydrous inert solvent, such as alcohol, toluol, butanol, or acetone, at moderate temperatures (50–125° C.). The presence of the tertiary alkyl group having eight or more carbon atoms in the aromatic ring ortho, metal or para to the ether group contributes to these new ether alcohols the property of low viscosity, high penetration, and unusual stability towards oxidation.

*Example 1.*—α,α,γ,γ-tetramethylbutylphenoxyethanol

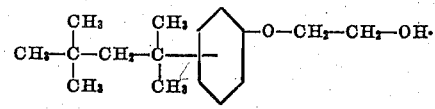

(a) A mixture of 50 grams of α,α,γ,γ-tetramethylbutylphenol (M. P. 84° C.), 1 gram powdered sodium hydroxide and 100 grams dry ethyl alcohol was refluxed for 15 minutes so as to dissolve the alkali. To the cooled solution thus obtained, a solution of 40 grams ethylene oxide in 100 grams ethyl alcohol was added and the mixture allowed to stand 18–24 hours at 10°–15° C. under an efficient reflux condenser. The mixture was then heated on a water bath for 3 hours at 50°–55° C. and finally for 3 hours at 80°–82° C. The alcohol was then distilled off and the residual oil fractionated under reduced pressure. The product distilled at 152°–164° C. at 1–2 mm. as a colorless, odorless oil, insoluble in water, but readily soluble in most organic solvents. The yield was 91% of theory.

(b) A mixture of 103 grams of α,α,γ,γ-tetramethylbutylphenol, 75 grams n-butanol, 75 grams toluene and 22 grams sodium hydroxide was boiled under reflux. The water which formed was continuously removed while the butanol-toluene mixture was automatically restored to the reaction vessel. After 2–3 hours of boiling, 9 grams of water were collected, showing that the formation of the dry sodium ter-octyl-phenate was complete. To the clear pale brown solution obtained, 44 grams powdered sodium hydroxide was added, the mixture cooled to about 5° C. and 120 grams ethylene chlorhydrine added all at once. The mixture was stirred vigorously for 5–6 hours at 5°–15° C. gradually increasing the temperature to 20°–25° C. and allowing the mixture to react thereat for 6–8 hours. Finally the mixture was warmed to about 90° C. during 12 hours. The sodium chloride which separated was filtered off and the filtrate distilled, first at ordinary pressure to recover the solvents and finally in vacuo. The product came over at 170°–175° C./3–4 mm. in a yield amounting to 113 grams.

*Sulphation of the above ether (b)*

40 grams of the above ether alcohol was dissolved in 280 grams ethylene dichloride. The solution was cooled to 0°–5° C. and 30 grams of 100% sulphuric acid added dropwise thereto during 20 minutes while maintaining the temperature below 10° C. The mixture was then stirred for 2 hours at this temperature, then placed in a separatory funnel and allowed to reach room temperature. Two layers formed, the lower of which was sulphuric acid which was run off. The clear upper ethylene dichloride layer was now cooled to 0° C. and neutralized to litmus with a solution of 8.5 grams sodium hydroxide in 92 cc. of water, while maintaining the temperature at 5°–8° C. The neutral mixture thus obtained was then evaporated under reduced pressure to recover the solvent and to dehydrate the mass. The product obtained weighed 58 grams. It formed a cream-colored, somewhat waxy, soap-like mass having the probable formula:

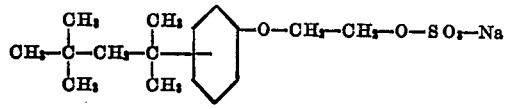

It was soluble in water to give a foamy solution of extremely low surface tension, and having powerful wetting-out properties. The potassium and ammonium salts are similar in their properties to the above sodium salt.

*Example 2.*—The phenol used was ter-iso-duodecylphenol, a condensation product of triisobutylene and phenol having the empirical formula

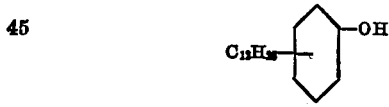

This material was prepared by condensing commercial triisobutylene with phenol in the presence of concentrated sulphuric acid It formed a viscous, partly waxy oil possessing a boiling range of 132°–145°/3–4 mm. A mixture of one mol of this triisobutylenephenol, 2 grams powdered caustic soda and 1.8 mols ethylene oxide was condensed in alcohol solution as described in Example 1. The tertiary-iso-duodecylphenoxyethanol

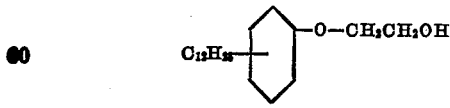

formed a colorless oil, boiling range 140°–185°/4 mm. Upon sulphation with concentrated sulphuric acid as described in Example 1, it gave a water-soluble sulphuric acid ester which, when neutralized with caustic soda in the cold, gave a foamy soapy solution from which on evaporation a brittle resin was obtained having good wetting-out properties.

*Example 3.*—The phenol used was ter-isohexadecylphenol, the condensation product of tetraisobutylene (boiling range 224°–259° C.) and phenol prepared by means of concentrated sulphuric acid as a catalyst. It formed a colorless waxy mass boiling at 130°–165° C./2 mm. 1 mol equivalent of this material was condensed with ethylene chlorhydrine and caustic soda as described in Example 1. The product, tertiary-isohexadecylphenoxyethanol,

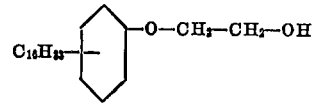

formed a colorless oil, boiling range 140°–172° C./3 mm. Upon sulphation it gave a soap-like product having good wetting-out properties.

*Example 4.*—The phenol used was ter-isooctylphenol of boiling range 137°–142° C./2 mm. as prepared by the condensation of phenol and the dibutene fraction of B. P. 106°–116° C. (obtained by the copolymerization of the three isomeric butenes by means of concentrated sulphuric acid).

The above ter-iso-octyl phenol was condensed with ethylene oxide in the presence of potassium hydroxide as described in Example 1. The product, ter-isooctylphenoxyethanol, was a colorless oil, B. P. 145°–150° C./2 mm.

*Example 5.*—A mixture of 103 grams α,α,γ,γ-tetramethylbutylphenol, 22 grams sodium hydroxide, 250 ccm. alcohol and 115 grams glycerol monochlorhydrine was stirred for 24 hours at 20°–30° C., then heated 6 hours at 70°–80° C. The sodium chloride was filtered off, the filtrate washed with water and the oil layer distilled to recover the solvents. The residual oil has the probable formula:

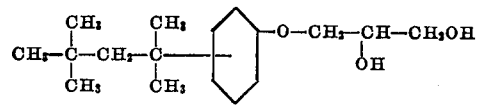

It formed a colorless, viscous oil boiling at 215°–220° C./7 mm. When esterified with 1 mol or 2 mol equivalents concentrated sulphuric acid at 0°–5° C. and the product neutralized with ammonia, an excellent wetting agent is obtained.

*Example 6.*—To a stirred mixture of 96 grams α,α,γ,γ-tetramethylbutyl-monochlorphenol (B. P. 128°–134° C./2 mm.), 200 grams alcohol, and 27 grams sodium hydroxide, there was added, dropwise, a solution of 48 grams ethylene chlorhydrine in 50 grams alcohol during 3 hours. The mixture was allowed to stand 18 hours at 25° C. and then heated with stirring on a water bath up to 70° C. during 6 hours. The sodium chloride was then filtered off and the filtrate fractionated. The product, α,α,γ,γ-tetramethylbutyl-chlor-phenoxyethanol, came over at 194° C./6 mm. as a viscous, pale oil.

*Example 7.*—To a solution of 50 grams α,α,γ,γ-tetramethylbutylphenol in 100 grams alcohol containing 1 gram sodium hydroxide there was added with cooling to 0° C. a solution of 16 grams propylene oxide in 50 grams alcohol. The mixture was allowed to stand 24 hours at 20° C. then heated under reflux 8 hours at 75°–80° C. Upon fractionating the product, α,α,γ,γ-tetramethyl-butyl-phenoxypropanol was obtained as a colorless oil boiling at 143°–145° C./2 mm. Yield 88% of theory.

*Example 8.*—Using 23 grams isobutylene oxide in place of the propylene oxide as shown in Example 7, there was obtained 59 grams of α,α,γ,γ-tetramethylbutylphenoxy tertiary butanol boiling at 145° C./1–2 mm.

As in the above examples, the tertiary alkyl group is advantageously derived from an olefine polymer of isobutylene, i. e., a dipolymer, tripolymer or tetrapolymer; since these bodies are the most readily accessible tertiary olefines containing respectively 8, 12, and 16 carbon atoms which are capable of forming the corresponding long chain tertiary alkyl phenols on condensation with phenols. However, the polymers of isoamylene, hexylene, heptene, octene and the like, having tertiary unsaturated carbon atoms, are likewise suitable for the purposes herein.

It is understood that the above examples are given merely by way of illustration and not limitation. It is apparent to one versed in the art that wide deviations are possible in starting materials, temperatures, conditions of operation, pressure, etc., without departing from the spirit of the invention, the scope of which is limited only by the following claims:

We claim:

1. The compound having the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\underset{\diagdown\diagup}{\overset{\diagup\diagdown}{\bigcirc}}-O-CH_2-CH_2-O-SO_3Na$$

2. The compound having the formula $$C_{12}H_{25}-\bigcirc-O-CH_2-CH_2-O-SO_3-Na$$

wherein $C_{12}H_{25}$ is a tertiary-iso-dodecyl radical.

3. The compound having the formula $$C_{16}H_{33}-\bigcirc-O-CH_2-CH_2-O-SO_3-Na$$

wherein $C_{16}H_{33}$ is a tertiary-iso-hexadecyl radical.

4. A compound having the general formula $$A-\bigcirc-O-CH_2-CH_2-O-SO_3M$$

in which A is a tertiary alkyl group containing at least eight carbon atoms and M is a member of the group consisting of hydrogen, the alkali metals and the ammonium radical.

5. A compound having the general formula $$A-\bigcirc-O-C_nH_{2n}-O-SO_3M$$

in which A is a tertiary alkyl group containing at least eight carbon atoms, M is a member of the group consisting of hdyrogen, the alkali metals and the ammonium radical and $n$ has a value of two, three or four.

6. A compound having the general formula $$A-\bigcirc-O-C_nH_{2n}-O-SO_3M$$

in which A is a tertiary alkyl group containing at least eight carbon atoms, M is a member of the group consisting of hydrogen, the alkali metals and the ammonium radical and $n$ is an integer greater than one.

7. A compound of the general formula $$A-R-O-C_nH_{2n}-O-SO_3M$$

in which A is a tertiary alkyl radical containing at least eight carbon atoms, R is an aromatic nucleus, M is a member of the group consisting of hydrogen, the alkali metals and the ammonium radical and $n$ is an integer greater than one.

8. In the process of preparing sodium $\beta(\alpha,\alpha,\gamma,\gamma\text{-tetramethylbutylphenoxy})$ ethyl sulphate the step which comprises treating $\beta(\alpha,\alpha,\gamma,\gamma\text{-tetramethylbutylphenoxy})$ethanol with sulfuric acid.

9. In the process of preparing compounds of the general formula $$A-\bigcirc-O-C_nH_{2n}-O-SO_3M$$

in which A is a tertiary alkyl group having at least eight carbon atoms, M is a member of the group consisting of hydrogen, the alkali metals and the ammonium radical, and $n$ has a value of two, three or four, the step which comprises treating an ether alcohol of the general formula $$A-\bigcirc-O-C_nH_{2n}-OH$$

with sulphuric acid.

10. In the process of preparing compounds of the general formula $$A-R-O-C_nH_{2n}-O-SO_3M$$

in which A is a tertiary alkyl group having at least eight carbon atoms, R is an aromatic nucleus, M is a member of the group consisting of hydrogen, the alkali metals and the ammonium radical, and $n$ has a value of two, three or four, the step which comprises treating an ether alcohol of the general formula $A-R-O-C_nH_{2n}-OH$ with sulphuric acid.

11. A compound of the formula $$A-\bigcirc-O-R'$$

in which A represents a tertiary alkyl group containing from eight to sixteen carbon atoms inclusive and R' represents an aliphatic radical containing an $OSO_3M$ group wherein M is a member of the group consisting of hydrogen, the alkali metals, and the ammonium radical.

12. A compound of the general formula $A-R-O-R'$ in which A represents a tertiary alkyl group of at least eight carbon atoms, R is an aromatic nucleus, and R' is an aliphatic radical containing an $OSO_3M$ group wherein M is a member of the group consisting of hydrogen, the alkali metals, and the ammonium radical.

13. A compound of the general formula $A-R-O-R'$ in which A represents a tertiary alkyl group of at least eight carbon atoms, R is an aromatic nucleus, and R' is an aliphatic radical terminating in an $OSO_3M$ group wherein M is a member of the group consisting of hydrogen, the alkali metals, and the ammonium radical.

14. A compound of the general formula $$CH_3-\underset{\underset{CH_3}{|}}{\overset{\overset{CH_3}{|}}{C}}-\underset{\underset{H}{|}}{\overset{\overset{H}{|}}{C}}-\underset{\underset{CH_3}{|}}{\overset{\overset{CH_3}{|}}{C}}-\bigcirc-O-R'$$

in which R' represents an aliphatic radical containing an $OSO_3M$ group wherein M is a member of the group consisting of hydrogen, the alkali metals, and the ammonium radical.

HERMAN A. BRUSON.
OTTO STEIN.